(12) United States Patent
Click, Jr. et al.

(10) Patent No.: US 6,553,565 B2
(45) Date of Patent: *Apr. 22, 2003

(54) METHOD AND APPARATUS FOR DEBUGGING OPTIMIZED CODE

(75) Inventors: Clifford N. Click, Jr., San Jose, CA (US); Christopher A. Vick, San Jose, CA (US); Michael H. Paleczny, Sunnyvale, CA (US)

(73) Assignee: Sun Microsystems, Inc, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/298,692

(22) Filed: Apr. 23, 1999

(65) Prior Publication Data

US 2002/0100018 A1 Jul. 25, 2002

(51) Int. Cl.$^7$ ............................................... G06F 9/44
(52) U.S. Cl. ..................... 717/129; 717/124; 717/125; 717/126; 717/127; 717/128; 717/130; 717/131; 717/132; 717/133
(58) Field of Search ............................. 717/4, 5, 7, 8, 717/9, 11, 124–133, 145–147

(56) References Cited

U.S. PATENT DOCUMENTS 5,539,907 A * 7/1996 Srivastava et al. ............. 703/26
5,732,273 A * 3/1998 Srivastava et al. .......... 717/128

OTHER PUBLICATIONS

Ramsey et al., "A retargetable debugger", ACM pp. 22–31, Jun. 1992.*

Breuer et al., "Decompilation: the enumeration of types and grammars", ACM, pp. 1613–1647, Sep. 1994.*

Ramsey et al., "Specifying Representations of Machine Instructions", ACM, pp. 492–524, May 1997.*

* cited by examiner

Primary Examiner—Gregory Morse
Assistant Examiner—Ted T. Vo
(74) Attorney, Agent, or Firm—Beyer Weaver & Thomas LLP (57) ABSTRACT

Methods and apparatus for providing a substantially full set of state information to a debugger, without significantly compromising system performance, in order to debug optimized computer program code are disclosed. According to one aspect of the present invention, a method for obtaining information associated with program code includes adding a segment of code, which includes a representation that is effectively not used after it is computed, to the program code. Debugging code is added in proximity to the segment of code, and machine code is generated from the program code. The machine code includes a break point that is associated with the debugging code, and includes an instruction at the breakpoint. Finally, the method includes replacing the instruction at the break point with a branch instruction that is arranged to cause the debugging code to execute.

20 Claims, 7 Drawing Sheets

METHOD AND APPARATUS FOR DEBUGGING OPTIMIZED CODE

BACKGROUND OF THE INVENTION

1. Field of Invention

The present invention relates generally to methods and apparatus for improving the performance of software applications. More particularly, the present invention relates to methods and apparatus for providing a debugging system with sufficient information to effectively debug optimized code.

2. Description of the Related Art

In an effort to increase the efficiency associated with the execution of computer programs, many computer programs are "optimized." Optimizing a computer program generally serves to eliminate portions of computer code which are essentially unused. In addition, optimizing a computer program may restructure computational operations to allow overall computations to be performed more efficiently, thereby consuming fewer computer resources.

An optimizer is arranged to effectively transform a computer program, e.g., a computer program written in a programming language such as C++, FORTRAN, or Java Bytecodes into a faster program. The faster, or optimized, program generally includes substantially all the same, observable behaviors as the original, or pre-converted, computer program. Specifically, the optimized program includes the same mathematical behavior has its associated original program. However, the optimized program generally recreates the same mathematical behavior with fewer computations.

Typically, an optimizer includes a register allocator and a core optimizer. As will be appreciated by those skilled in the art, a register allocator moves computations from memory space into register space, while the core optimizer implements mathematical computations associated with the optimized program. In the course of creating an optimized program, an optimizer eliminates unused code. For example, codes associated with variables in an original program that are not used outside of a loop are generally eliminated. Such variables may include, but are not limited to, counter variables used as indexes within loops.

Figure 1:
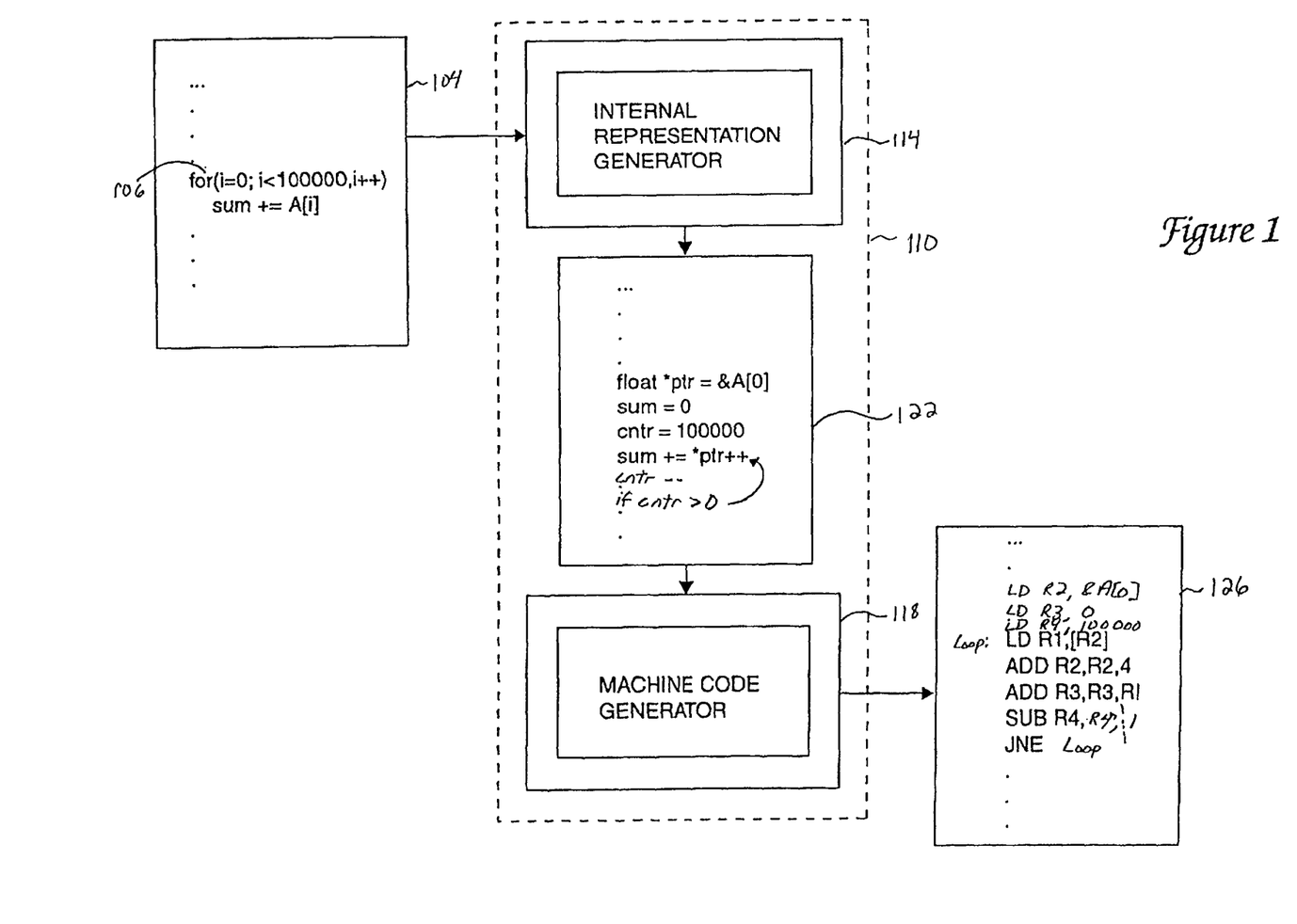
FIG. 1 is a diagrammatic representation of an optimizer which transforms a computer program into an optimized computer program.

When an optimizer transforms a computer program, the optimizer often creates an internal representation of the computer program. The internal representation may then be used to generate machine code that is a computational equivalent of the computer program. FIG. 1 is a diagrammatic representation of an optimizer which transforms a computer program into an optimized computer program. A computer program 104, which may be written in any suitable computer programming language, is provided to an optimizer 110. As shown, computer program 104 includes a "for" loop 106 that includes a variable "i."

Optimizer 110, which is effectively a compiler, includes an internal representation generator 114 and a machine code generator 118. Internal representation generator 114 takes computer program 104 as input, and produces an internal representation 122 of computer program 104. Internal representation generator 114 typically removes unused code, e.g., index variables such as variable "i," such that internal representation 122 has no references to the unused code.

Internal representation 122 is provided as input to machine code generator 118, which produces machine code 126, i.e., a transformed computational equivalent of computer program 104. As internal representation 122 does not include references to the unused code, it should be appreciated that machine code 126 also does not include references to the unused code. By eliminating the unused code, machine code 126 may execute more efficiently than it would if the unused code were included.

Figure 2:
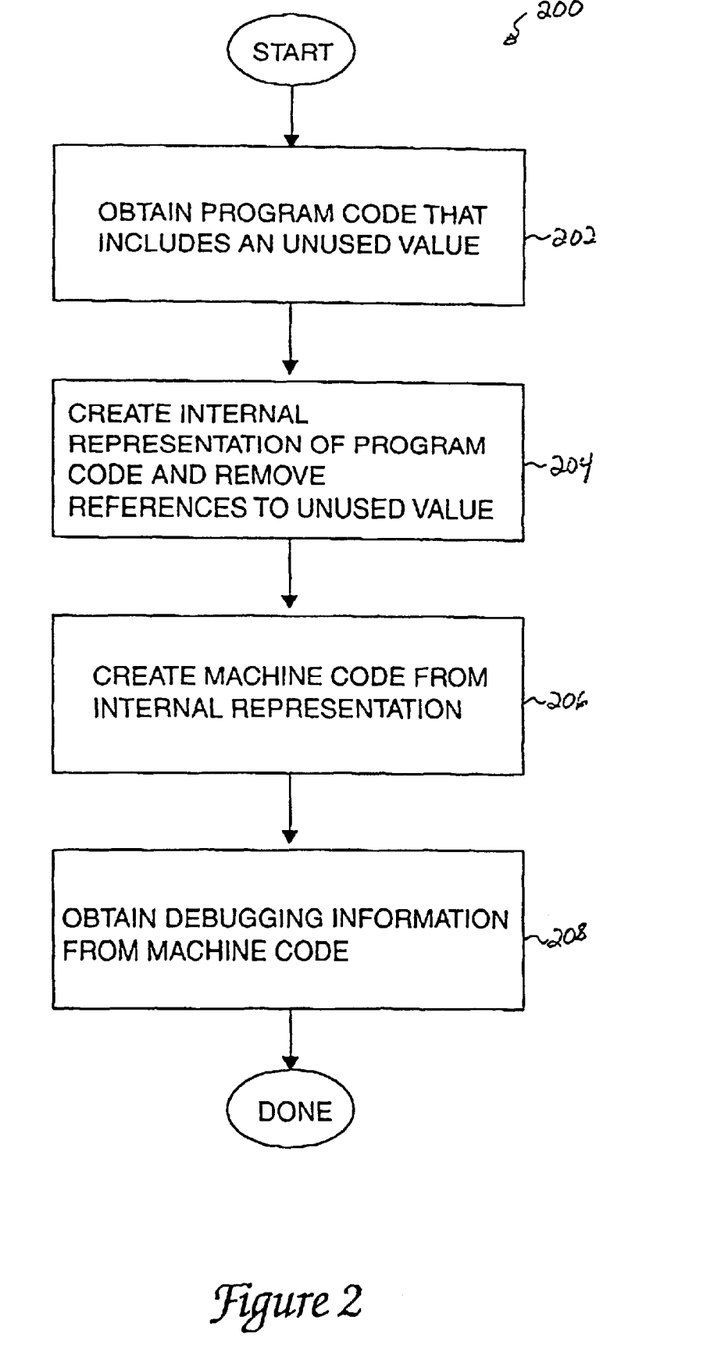
FIG. 2 is a process flow diagram which illustrates the steps associated with optimizing a program and debugging the optimized program.

Machine code 126, which represents a transformed or optimized version of computer program 104, is typically accessed by a debugger when machine code is to be debugged. While optimized code may be debugged for a variety of different reasons, optimized code is often debugged in order to identify errors which are only manifested in optimized code. Debugging may also occur to identify internal states associated with the code, as will be appreciated by those skilled in the art. FIG. 2 is a process flow diagram which illustrates the steps associated with optimizing a program and debugging the optimized program. A process 200 of optimizing and debugging a program begins at step 202 in which program code that contains an unused value, or variable, is obtained by an optimizer. Once the program code is obtained, an internal representation of the program code is generated in step 204. Generating an internal representation of the program code typically entails removing references to the unused value, as previously mentioned.

After the internal representation of the program code is created, machine code is generated from the internal representation in step 206. A debugger then accesses the machine code in step 208, and obtains available debugging information from the machine code. In general, debugging information includes state information at different points in the machine code. Such debugging information is generated by "de-optimizing" the optimized code. When unused code, e.g., a dead variable, is removed from an optimized program, that unused code generally may not be re-obtained during a debugging process. As such, a precise relationship between debugged code and optimized code either may not be obtained, or may be incorrect, as will be understood by those skilled in the art. In other words, the debugging information obtained may be inaccurate. Once the debugging information is obtained, the process of optimizing code and debugging the optimized code is completed.

In an environment with a virtual machine, e.g., a Java™ virtual machine developed by Sun Microsystems, Inc. of Palo Alto, Calif., it may be desirable to convert optimized code to interpreted code. In order to accurately return optimized code to an interpreted equivalent, valid Java™ virtual machine states are typically needed for all variables. Not all states may be available in the event that code pertaining to some states may have been removed during an optimization process. When such states are unavailable, the conversion to interpreted code generally may not occur at all, or may be inaccurate. Inaccuracy in a conversion may result in substantially incorrect results for the overall-computing environment.

Therefore, what is desired is an efficient method for obtaining debugging information from optimized code. That is, what is needed is a method and an apparatus for enabling states associated with unused values to be efficiently obtained during a debugging, or deoptimizing, process.

SUMMARY OF THE INVENTION

The present invention relates to providing a substantially full set of state information to a debugger, without significantly compromising system performance, in order to debug optimized computer program code. According to one aspect of the present invention, a method for obtaining information associated with program code includes adding a segment of code, which includes a representation that is effectively not used after it is computed, "the debugging code", to the program code. A "break point" is chosen in proximity to the segment of code, and machine code is generated from the program code. Finally, the method includes replacing the instruction at the break point with a branch instruction that is arranged to cause the debugging code to execute. By executing the debugging code, states that would generally be eliminated in optimized machine code are available to a debugger or deoptimizer, thereby enabling the machine code to be accurately debugged or deoptimized.

In one embodiment, the segment of code is associated with a program loop. In such an embodiment, adding a break point in proximity to the segment of code may include integrating the break point into the program loop. The debugging code may further include code that calls a debugging function arranged to debug the program code.

According to another aspect of the present invention, a computer-implemented method for obtaining information associated with program code may include adding a call to a subroutine, i.e., the "debugging code", that is associated with the program code. The call to the subroutine includes a plurality of arguments where at least one of the arguments is a reference to a representation associated with a computation. The representation is essentially unused with respect to the program code and the subroutine. The computer-implemented method also includes generating machine code associated with the program code by substantially transforming the call to the subroutine into debugging code.

In yet another aspect of the present invention, a method for debugging optimized code includes generating a higher-level program representation that includes a loop section with an associated counter value and a segment of debugging code. The method also includes optimizing the higher-level program representation by converting the higher-level program representation into lower-level code that includes a section associated with the debugging code and a break point. The instruction at the breakpoint is replaced with a branch instruction that causes the section associated with the break point to execute. Finally, the debugging code is executed, thereby providing information associated with the counter value.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

At times, it may be desirable or even necessary to debug optimized code. In general, compilers do not support the debugging of optimized code. When code is optimized, information that would otherwise be available in source code may be destroyed. By way of example, variables which are dead may be eliminated. As such, when an attempt is made to debug the optimized code, it is generally not possible to retrieve information associated with dead variables. Therefore, the debugging information that is obtained may not be accurate. Inaccurate debugging information often makes it difficult to trace problems in source code, and also makes it difficult to convert the optimized code back into source code.

In an environment with a virtual machine such as a Java™ virtual machine developed by Sun Microsystems, Inc. of Palo Alto, Calif., it may be desirable to convert optimized code to interpreted code. For example, optimized code which is rarely used may be converted to interpreted code in an effort to better allocate system resources. Valid Java™ virtual machine states are typically needed for all variables in order to perform a conversion from optimized code to interpreted code. Not all states may be available in the event that variables that are relevant to some states may have been removed during an optimization process. When states are unavailable, the conversion to interpreted code may result in the occurrence of errors. Inaccuracy in a conversion may result in substantial problems for the overall computing environment.

Including debugging information, e.g., information pertaining to dead variables or unused values, as a part of the execution semantics of a computer program allows an optimizer to transform the computer program to the best of its ability while also transforming the debugging information. Although transforming debugging information in the course of optimizing a computer program may preclude some optimizations, thereby compromising the overall optimization of the computer program, improved debugging may be achieved. Specifically, program code that is needed to accurately debug a computer program is optimized and register allocated along with the remainder of the computer program. Hence, the optimization level of the computer program is relatively high and still allows for debugging.

In order to include debugging information as a part of the execution semantics of a computer program, debugging code may be included in the computer program. Debugging code effectively provides information necessary to inform a runtime system such as a debugger where values, e.g., state values, are located and inhibits optimizations which would eliminate unused values or dead code which may be requested during debugging.

Figure 3A:
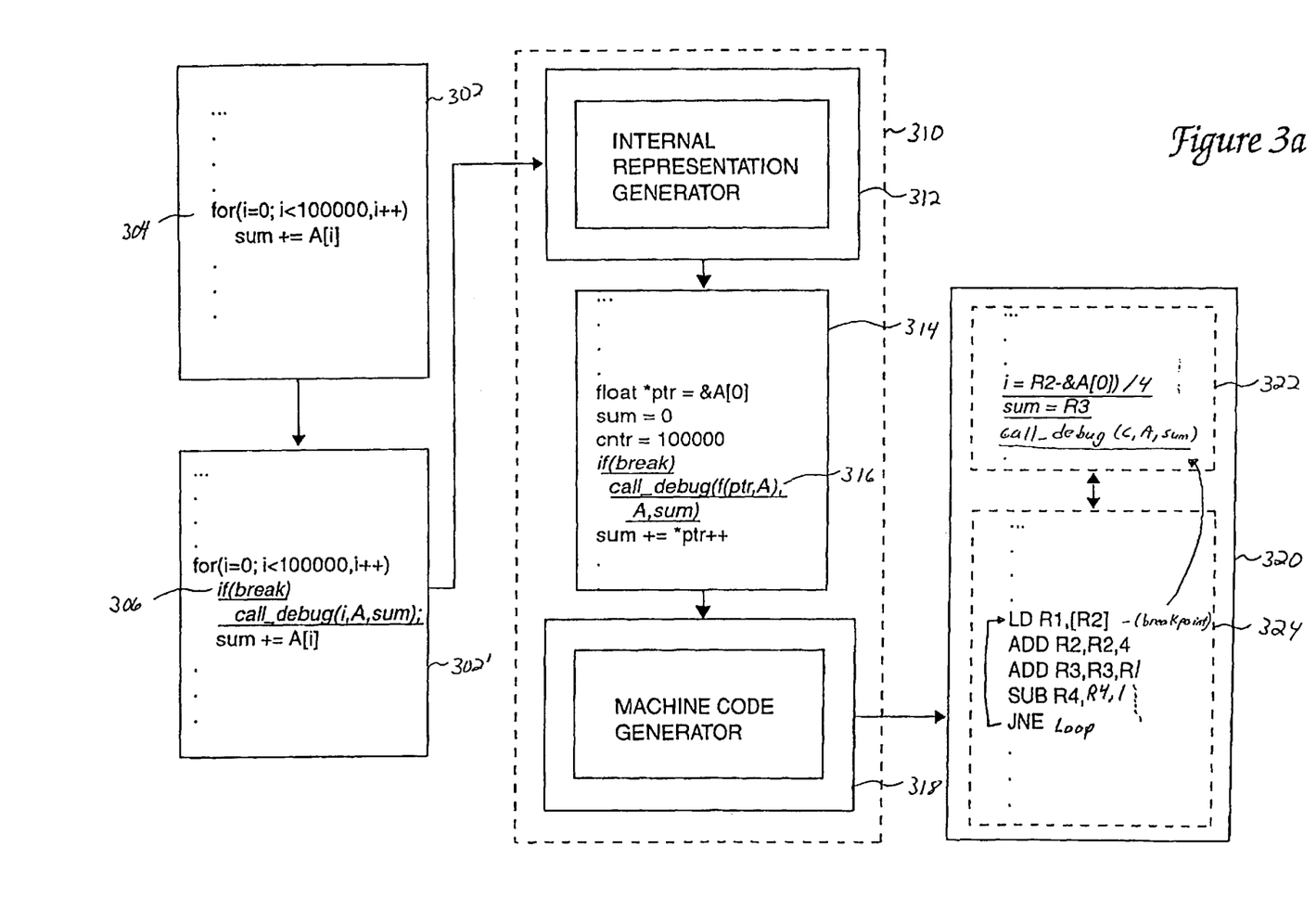
FIG. 3a is a diagrammatic representation of an optimizer which transforms a computer program with breakpoint code into an optimized computer program with breakpoint code in accordance with an embodiment of the present invention.

FIG. 3a is a diagrammatic representation of an optimizer which transforms a computer program with breakpoint code into an optimized computer program with breakpoint code in accordance with an embodiment of the present invention. A computer program 302, or source code, which may be written in any suitable computer programming language, includes a code segment 304. As shown, code segment 304 is a "for" loop that includes an index variable "i" which is effectively an unused value, or a "dead" variable. That is, index variable "i" typically is not used outside of the "for" loop. It should be noted that although code segment 304 is shown as a "for" loop, code segment 304 may include any suitable loop.

In the described embodiment, debugging code 306 is typically inserted within the "for" loop, thereby creating a slightly modified computer program 302'. Although debugging code 306 may be widely varied, debugging code 306 is often a call to a debugger that is made with the index variable "i" as an argument. The placement of breakpoint code 306 is arranged to mark a location for a potential breakpoint instruction. By way of example, debugging code 306 may be placed substantially anywhere in computer program 302' where knowledge of all available states associated computer program 302' may be desired. Debugging code 306 is generally arranged to reference a table that maps a break point to the locations that contain the desired states.

Computer program 302' is provided to an optimizer 310 or, more specifically, an internal representation generator 312. Optimizer 310, as well as a debugger (not shown), are typically included as part of a compiler. In the described embodiment, internal representation generator 312 is arranged to generate a Java™ representation 314 of computer program 302'. However, it should be appreciated that other suitable representations may be generated by internal representation generator 312 in alternative embodiments. Representation 314 includes a representation 316 of debugging code 306. As representation 316 of debugging code 306 is included in representation 314, state information associated with unused value "i" is present in representation 314.

Representation 314 is provided as input to a machine code generator 318 that is a part of optimizer 310. Machine code 320 that is generated by machine code generator 318 includes a debugging code 322 that is associated debugging code 306. Machine code 320 also includes a main body 324 that includes code associated with "for" loop 304. Debugging code 322 is arranged to run in response to a break point which effectively halts the execution of code associated with "for" loop 304.

Figure 3B:
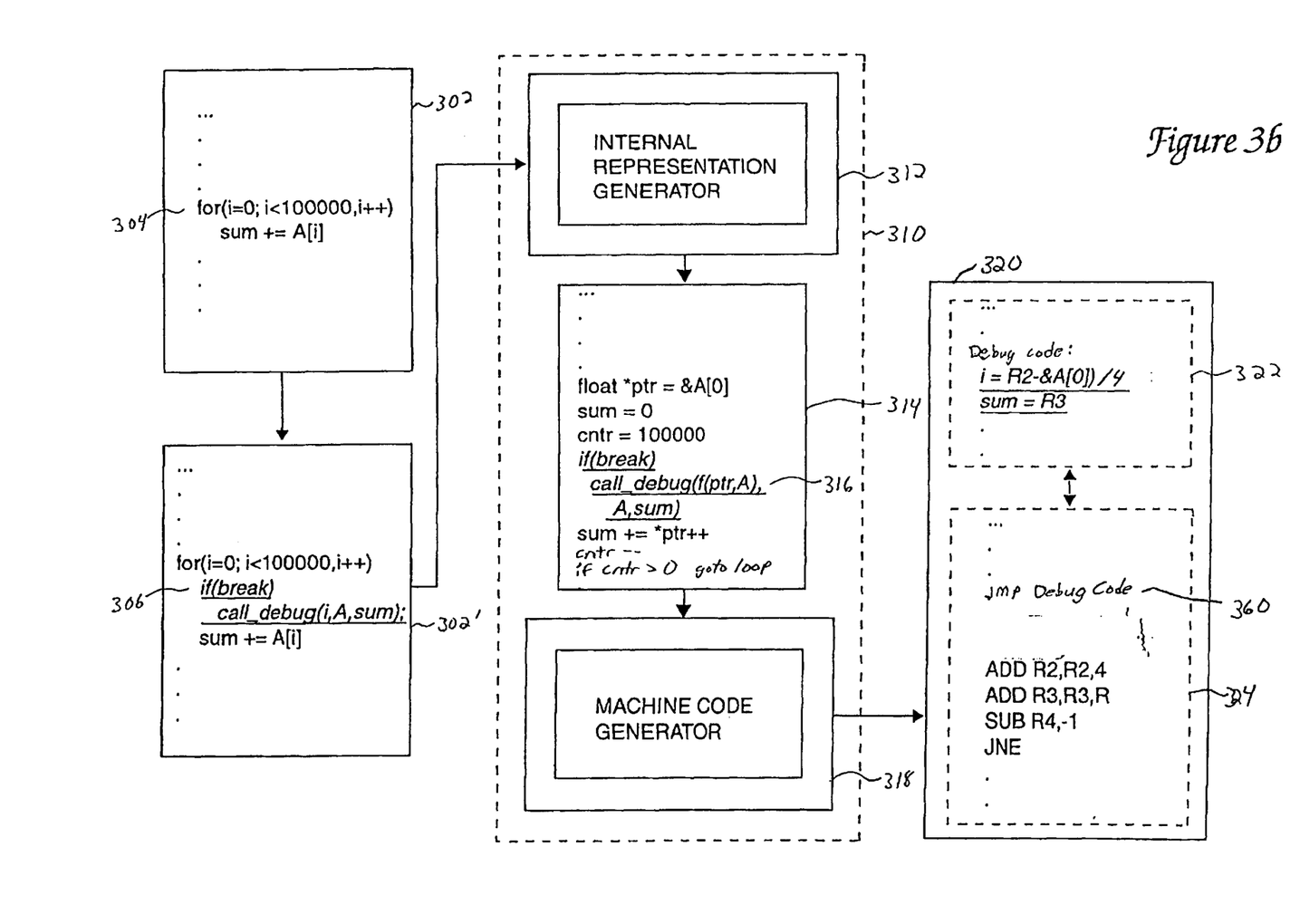
FIG. 3b is a diagrammatic representation of optimizer 310 of FIG. 3a with machine code 320 which includes a breakpoint instruction in accordance with an embodiment of the present invention.

A debugger may modify machine code 320 or, more specifically, main body 324, such that debugging code 322 is reached. When debugging code 322 is reached, state information associated with unused value "i" may be obtained. In a Java™ enviroment, the state information associated with unused value "i" may be used in a deoptimization process that converts optimized, e.g., compiled, code into interpreted code. FIG. 3b is a diagrammatic representation of optimizer 310 of FIG. 3a with machine code 320 which includes a branch instruction in accordance with an embodiment of the present invention. A branch instruction 360 replaces, or otherwise overwrites, a load instruction in main body 324 that is associated with "for" loop 304. Branch instruction 360 causes program logic to jump to debugging code 322 where state information pertaining to unused value "i" may be obtained in the course of executing a debugger or a deoptimizer.

In general, an optimizer such as optimizer 310 honors substantially all definitions and uses associated with program 302 while eliminating unused code, as will be appreciated by those skilled in the art. Adding debugging code 306 to allow state information pertaining to unused values to be obtained may slow the execution of machine code 320, and, as a result, compromise the optimization of program 302. However, it has been observed that break points generally do not slow the execution of machine code 320 significantly. In other words, adding break points to program code greatly improves the debugging and deoptimizing capabilities associated with the program code without significantly sacrificing the performance of the program code.

Figure 4:
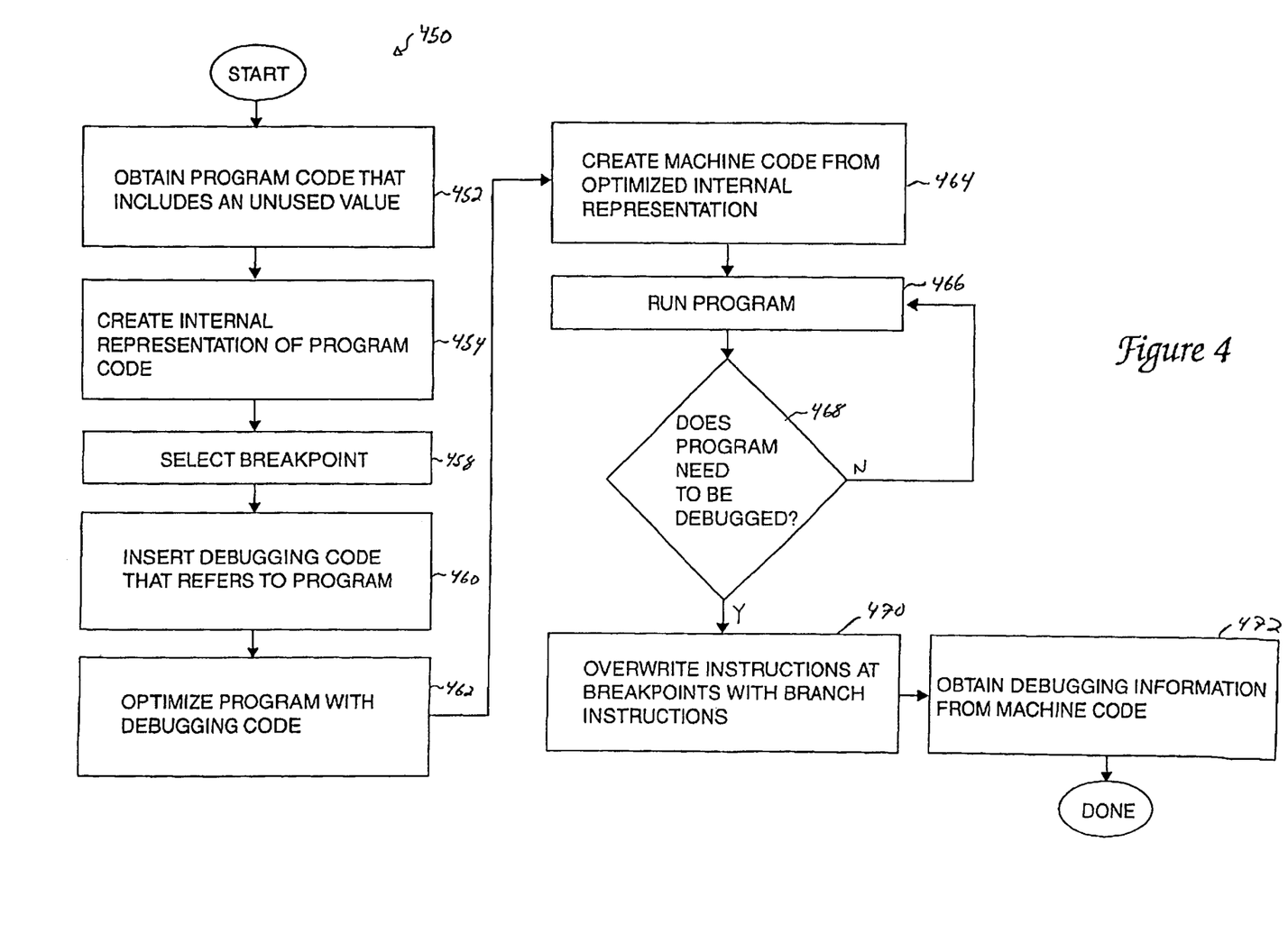
FIG. 4 is a process flow diagram which illustrates the steps associated with optimizing and debugging a computer program with debugging code in accordance with an embodiment of the present invention.

FIG. 4 is a process flow diagram which illustrates the steps associated with optimizing and debugging a computer program with debugging code in accordance with an embodiment of the present invention. A process 450 for optimizing and debugging a computer program beings at step 452 in which a computer program, or program code, which includes debugging code and, hence, an unused value is obtained. An internal representation of the program code is created in step 454. It should be appreciated that while the unused value is effectively not eliminated due to the fact that breakpoint code is included in the program code, the internal representation typically includes computations that are simplified with respect to the program code.

After the internal representation is created in step 454, a break point is selected in step 458. In the described embodiment, the selection of a break point involves identifying, for example, a section of code in the internal representation which is associated with an unused value. Once a break point is selected, then in step 460, debugging code that refers to the program or, more specifically, the internal representation of the program, is inserted. The debugging code is typically inserted with respect to the selected breakpoint.

As will be appreciated by those skilled in the art, the selection of a break point in step 458 and the insertion of debugging code in step 460 may be repeated until all potential locations for break points are processed. In other words, steps 458 and step 460 may be a part of a loop which allows all potential break points to be selected such that debugging code may be inserted with respect to each potential break point.

Once the debugging code is inserted in step 460, the program, which includes the debugging code, is optimized in step 462 using substantially any suitable method. Machine code is created from the internal representation in step 456 after the program is optimized. The machine code that is created is effectively an optimized version of the original program code which was obtained in step 452. Once created, the machine code may then be accessed by a debugger, or a deoptimizer.

In step 466, the program is run or otherwise executed, i.e., the machine code generated in step 464 is executed. During the course of running the program, a determination is made in step 468 regarding whether the program is in need of debugging. Such a determination may be based upon a variety of different factors. For example, the determination may be based at least partially upon whether debugging information is required for a particular application.

If it is determined in step 468 that the program does not require debugging, then the program continues to run in step 466. As will be appreciated by those skilled in the art, the program may continue to run until it is terminated. Alternatively, if the determination in step 468 is that the program needs to be debugged, then instructions at break points are overwritten with branch instructions in step 470. By way of example, a load instruction in a loop may be replaced with a branch instruction which, as described with respect to FIG. 3b, may be an instruction that instructs program flow to jump to a section of the machine code which includes debugging code. As will be understood by those skilled in the art, a branch instruction may be a traditional branch instruction, e.g., a "jump" instruction. Alternatively, a branch instruction may be a breakpoint instruction, a trap instruction, or substantially any other instruction that is arranged to directly alter control flow.

After instructions are overwritten, debugging information is obtained from the machine code in step 472. In a Java™ environment, the debugging information may include states associated with a virtual machine such as a Java™ virtual machine. Once the debugging information is obtained, the process of optimizing code and debugging the optimized code is completed.

Figure 5:
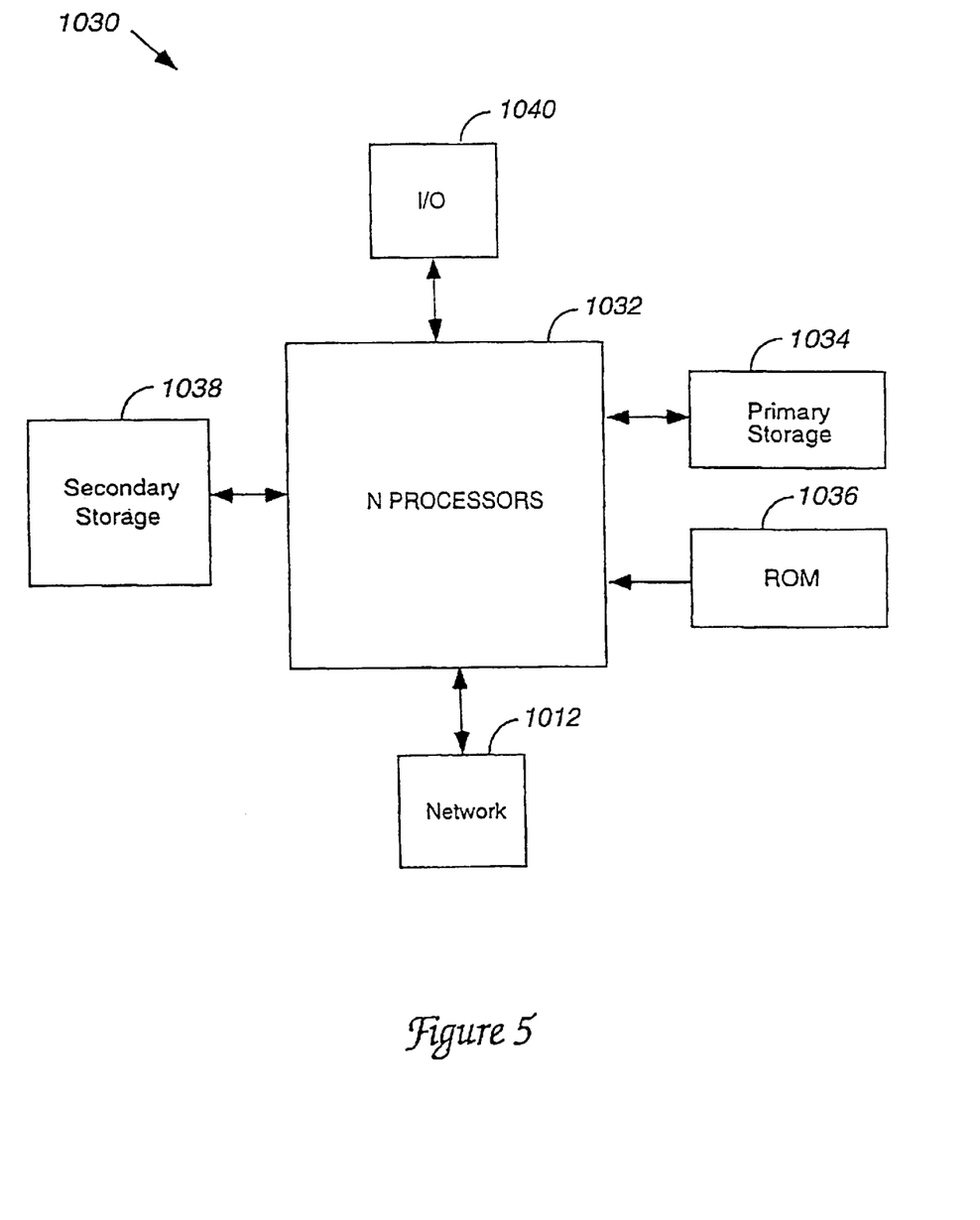
FIG. 5 is a diagrammatic representation of a general purpose computer system suitable for implementing the present invention.

FIG. 5 illustrates a typical, general purpose computer system suitable for implementing the present invention. The computer system 1030 includes any number of processors 1032 (also referred to as central processing units, or CPUs) that are coupled to memory devices including primary storage devices 1034 (typically a random access memory, or RAM) and primary storage devices 1036 (typically a read only memory, or ROM).

Computer system 1030 or, more specifically, CPU 1032, may be arranged to support a virtual machine, as will be appreciated by those skilled in the art. One example of a virtual machine that is supported on computer system 1030 will be described below with reference to FIG. 6. As is well known in the art, ROM acts to transfer data and instructions uni-directionally to the CPU 1032, while RAM is used typically to transfer data and instructions in a bi-directional manner. CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code, data, and the like. Typically, mass memory device 1038 is a storage medium such as a hard disk or a tape which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1012. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

Figure 6:
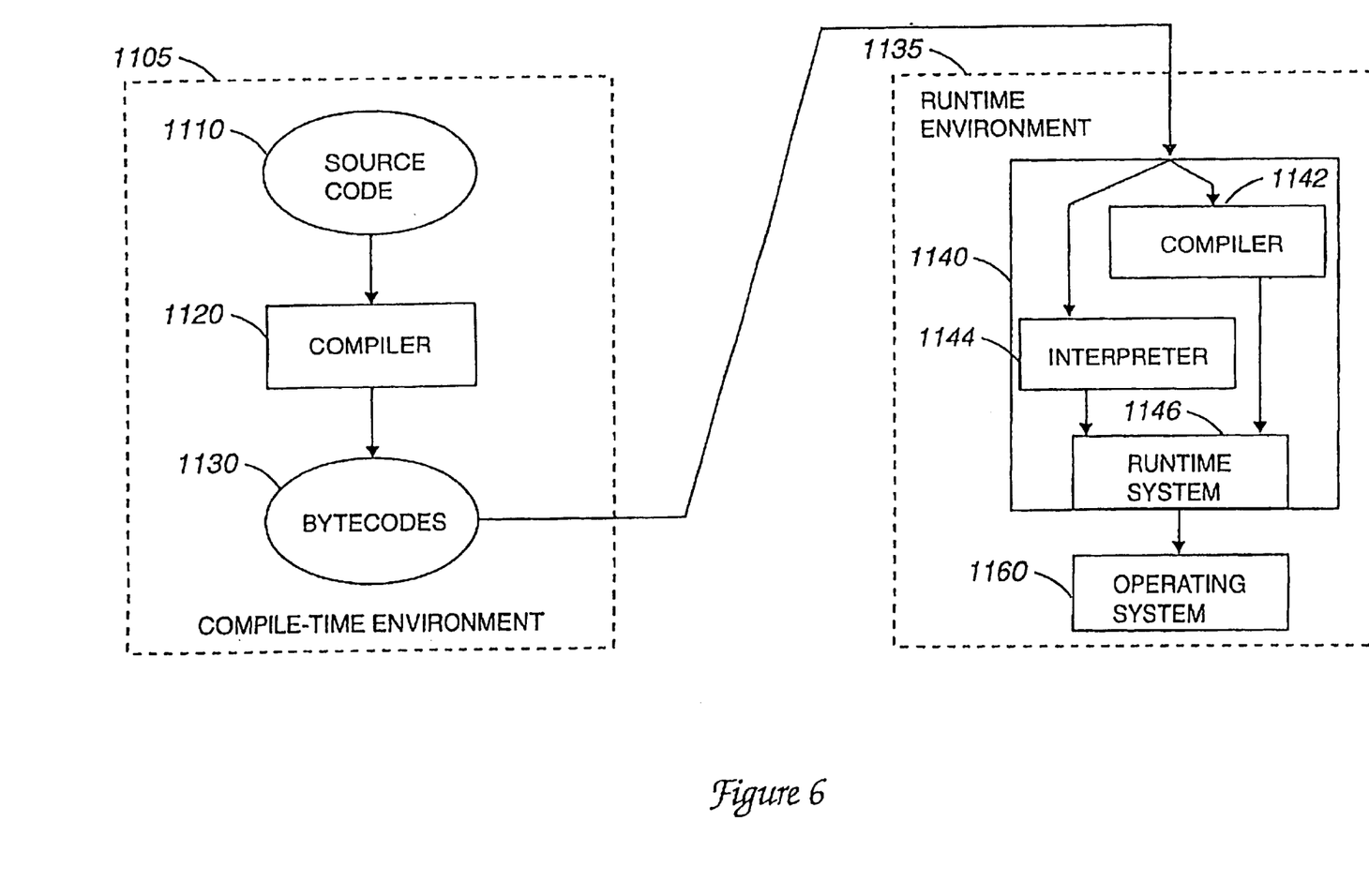
FIG. 6 is a diagrammatic representation of a virtual machine that is supported by the computer system of FIG. 5, and is suitable for implementing the present invention.

As previously mentioned, a virtual machine may execute on computer system 1030. FIG. 6 is a diagrammatic representation of a virtual machine which is supported by computer system 1030 of FIG. 5, and is suitable for implementing the present invention. When a computer program, e.g., a computer program written in the Java™ programming language developed by Sun Microsystems of Palo Alto, Calif., is executed, source code 1110 is provided to a compiler 1120 within a compile-time environment 1105. Compiler 1120 translates source code 1110 into byte codes 1130. In general, source code 1110 is translated into byte codes 1130 at the time source code 1110 is created by a software developer.

Byte codes 1130 may generally be reproduced, downloaded, or otherwise distributed through a network, e.g., network 1012 of FIG. 5, or stored on a storage device such as primary storage 1034 of FIG. 5. In the described embodiment, byte codes 1130 are platform independent. That is, byte codes 1130 may be executed on substantially any computer system that is running a suitable virtual machine 1140. By way of example, in a Java™ environment, byte codes 1130 may be executed on a computer system that is running a Java™ virtual machine.

Byte codes 1130 are provided to a runtime environment 1135 which includes virtual machine 1140. Runtime environment 1135 may generally be executed using a processor such as CPU 1032 of FIG. 5. Virtual machine 1140 includes a compiler 1142, an interpreter 1144, and a runtime system 1146. Byte codes 1130 may generally be provided either to compiler 1142 or interpreter 1144.

When byte codes 1130 are provided to compiler 1142, methods contained in byte codes 1130 are compiled into machine instructions, as described above. On the other hand, when byte codes 1130 are provided to interpreter 1144, byte codes 1130 are read into interpreter 1144 one byte code at a time. Interpreter 1144 then performs the operation defined by each byte code as each byte code is read into interpreter 1144. In general, interpreter 1144 processes byte codes 1130 and performs operations associated with byte codes 1130 substantially continuously.

When a method is called from an operating system 1160, if it is determined that the method is to be invoked as an interpreted method, runtime system 1146 may obtain the method from interpreter 1144. If, on the other hand, it is determined that the method is to be invoked as a compiled method, runtime system 1146 activates compiler 1142. Compiler 1142 then generates machine instructions from byte codes 1130, and executes the machine-language instructions. In general, the machine-language instructions are discarded when virtual machine 1140 terminates. The operation of virtual machines or, more particularly, Java™ virtual machines, is described in more detail in *The Java™ Virtual Machine Specification* by Tim Lindholm and Frank Yellin (ISBN 0-201-63452-X), which is incorporated herein by reference in its entirety.

Although only a few embodiments of the present invention have been described, it should be understood that the present invention may be embodied in many other specific forms without departing from the spirit or the scope of the invention. By way of example, steps involved with running a debugger or a deoptimizer may be reordered, removed or added. Further, in some embodiments, the steps associated with creating a program that includes break points may be modified. In general, steps involved with the methods of the present invention may be reordered, removed, or added without departing from the spirit or the scope of the present invention.

The use of debugging code and break points has generally been described as being associated with a Java™ environment. However, in some embodiments, the environment may not necessarily be a Java™ environment. By way of example, in lieu of using a Java™ virtual machine, substantially any suitable virtual machine may be implemented.

Further, while break points have been described as being placed within loops, it should be appreciated that break points may generally be placed anywhere in a computer program where a potential break may be desired. That is, break points may be inserted anywhere in a computer program where it may potentially be necessary to obtain all available values. Therefore, the present examples are to be considered as illustrative and not restrictive, and the invention is not to be limited to the details given herein, but may be modified within the scope of the appended claims.

What is claimed is:

1. A computer-implemented method for obtaining information associated with program code, the computer-implemented method comprising:

adding a segment of code to the program code, the segment of code including a representation associated with a computation, the representation being arranged to be substantially unprocessed;

adding debugging code in proximity to the segment of code;

optimizing the program code;

generating machine code associated with the optimized program code, the machine code including a break point and an associated instruction, the break point being associated with the debugging code; and replacing the instruction at the break point with a branch instruction, the branch instruction being arranged to cause the debugging code to execute, wherein when the debugging code executes, information associated with the representation is obtained.

2. A computer-implemented method as recited in claim 1 wherein adding debugging code in proximity to the segment of code includes integrating the debugging code into the segment of code.

3. A computer-implemented method as recited in claim 1 wherein the segment of code is associated with a program loop.

4. A computer-implemented method as recited in claim 3 wherein adding debugging code in proximity to the segment of code includes integrating the debugging code into the program loop.

5. A computer-implemented method as recited in claim 4 wherein the debugging code includes code that calls a debugging function arranged to debug the program code.

6. A computer-implemented method as recited in claim 4 wherein the debugging code includes code that calls a de-optimizing function arranged to de-optimize the program code.

7. A computer-implemented method as recited in claim 1 further including:

converting the program code into an internal representation, wherein generating the machine code associated with the program code includes generating the machine code from the internal representation.

8. A computer-implemented method as recited in claim 1 wherein generating the machine code associated with the program code includes generating machine code associated with the representation.

9. A computer-implemented method as recited in claim 8 further including:

executing the debugging code, wherein executing the debugging code is arranged to provide information associated with the representation.

10. A computer-implemented method as recited in claim 9 wherein the debugging code is executed by one of a debugger and a deoptimizer.

11. A computer apparatus for obtaining information associated with program code, the computer apparatus comprising:

a programming interface arranged to add a segment of code to the program code, the segment of code including a representation associated with a computation, the representation being arranged to be substantially unprocessed, the programming interface further being arranged to add debugging code in proximity to the segment of code;

an optimizer arranged to optimize the program code;

a machine code generator arranged to generate machine code associated with the optimized program code, the machine code including a break point, the break point being associated with the debugging code, wherein the machine code further includes a instruction at the break point location; and a decompiler arranged to replace the instruction with a branch instruction, wherein the branch instruction is arranged to cause the debugging code to execute.

12. A computer apparatus according to claim 11 wherein the programming interface arranged to add debugging code in proximity to the segment of code is further arranged to integrate the debugging code into the segment of code.

13. A computer apparatus according to claim 11 wherein the segment of code is associated with a program loop, and the programming interface arranged to debugging code in proximity to the segment of code is further arranged to integrate the debugging code into the program loop.

14. A computer apparatus according to claim 11 further including:

a code converter arranged to convert the program code into an internal representation, wherein the machine code generator is arranged to generate the machine code from the internal representation.

15. A computer apparatus according to claim 14 further including:

a debugger arranged to execute the debugging code, wherein executing the debugging code is arranged to provide information associated with the representation.

16. A computer apparatus according to claim 14 further including:

a deoptimizer arranged to execute the debugging code, wherein executing the debugging code is arranged to provide information associated with the program representation.

17. A computer program product for obtaining information associated with a particular set of instructions, the computer program product comprising:

computer code that includes a representation associated with a computation, the representation being arranged to be substantially unprocessed, wherein the computer code includes debugging code;

computer code for generating machine code associated with the computer code that includes the representation and the debugging code, the machine code including a break point, the break point being associated with the debugging code, wherein the machine code further includes a instruction;

computer code for replacing the instruction with a branch instruction, the branch instruction being arranged to cause the debugging code to execute, wherein causing the debugging code to execute provides information associated with the representation; and a computer-readable medium that stores the program codes.

18. A computer program product according to claim 17 wherein the computer-readable medium is one selected from the group consisting of a data signal embodied in a carrier wave, a CD-ROM, a hard disk, a floppy disk, a tape drive, and flash memory.

19. A computer-implemented method for obtaining information associated with program code, the computer-implemented method comprising:

adding a call to a subroutine, the subroutine being associated with the program code, the call to the subroutine including a plurality of arguments, wherein at least one of the plurality of arguments is a reference to a representation associated with a computation, the representation being unused with respect to the program code and the subroutine; and generating machine code associated with the program code, wherein generating the machine code includes substantially transforming the call to the subroutine into debugging code.

20. A computer-implemented method for debugging optimized code, the computer-implemented method comprising:

generating a higher-level program representation, the higher-level program representation including a loop section, the loop section having an associated counter value, wherein the loop section includes a segment of break point code;

optimizing the higher-level program representation, wherein optimizing the higher-level program representation includes converting the higher-level program representation into lower-level code, the lower-level code including a section associated with the debugging code and a instruction;

replacing the instruction with a branch instruction, branch instruction being arranged to cause the section associated with the debugging code to execute; and executing the branch instruction, wherein executing branch instruction causes the section associated with the debugging code to execute and to provide information associated with the counter value.

* * * * *